United States Patent [19]

Bruins et al.

[11] Patent Number: 5,407,313
[45] Date of Patent: Apr. 18, 1995

[54] ROOFING NAIL PRESSURE PLATE

[75] Inventors: Roger C. Bruins; Jon Tanis, both of Jenison, Mich.

[73] Assignee: National Nail Corp., Grand Rapids, Mich.

[21] Appl. No.: 737,173

[22] Filed: Jul. 29, 1991

[51] Int. Cl.⁶ .............................................. F16B 43/02
[52] U.S. Cl. .................................... 411/544; 411/369; 411/542
[58] Field of Search .............. 411/915, 542, 371, 369, 411/368, 531, 533, 396

[56] References Cited

U.S. PATENT DOCUMENTS

| | | | |
|---|---|---|---|
| 4,074,501 | 2/1978 | Sandqvist | 411/371 X |
| 4,361,997 | 12/1982 | DeCaro | 411/368 X |
| 4,715,756 | 12/1987 | Danico et al. | 411/542 X |
| 4,726,164 | 2/1988 | Reinwall | 411/533 X |
| 4,799,845 | 1/1989 | Hrysko | 411/542 |
| 5,069,589 | 12/1991 | Lemke | 411/82 X |

FOREIGN PATENT DOCUMENTS

| | | | |
|---|---|---|---|
| 947816 | 1/1964 | United Kingdom | 411/542 |
| 1046456 | 10/1966 | United Kingdom | 411/542 |

Primary Examiner—Rodney M. Lindsey
Attorney, Agent, or Firm—Waters & Morse

[57] ABSTRACT

A resilient molded pressure plate formed of polypropylene or the like is provided for a roofing nail in engagement with a sheet of roofing felt to increase the retention of the felt. The underside of the plate is concave in the undeflected form, and is provided with a central boss that limits the downward diaphragm deflection as a nail is driven through a central opening. The peripheral rim of the plate is serrated with concentric ridges disposed initially at progressively increasing distances from the plane of the outer ridge, proceeding radially inward. As the plate is deflected on driving of the nail through the central opening, these ridges come into coplanar relationship, providing the maximum intensity of engagement with the sheet of felt material.

13 Claims, 1 Drawing Sheet

ROOFING NAIL PRESSURE PLATE

BACKGROUND OF THE INVENTION

The construction of a sloped roof commonly involves the placement of a plywood sub-roof structure on roof trusses and then covering the plywood with a water resistant sheet of tar impregnated paper, generally referred to as "roofing felt" and sometimes known as "tar paper". This material is secured to the sub-roof plywood with nails. This assembly is typically covered with shingles or other conventional roofing materials to complete the roof.

Nailing the roofing felt securely to a substrate such as a wood sub-roof can be difficult. Because of the necessity to make a structure waterproof as soon as possible, the sub-roof and waterproof roofing felt are applied as quickly as possible to the roof trusses. However, the shingles may be applied some time later. In such a case, it is important that the roofing felt provide a watertight cover on the roof. Roofing felt, however, is not a tough material and is prone to rip on the nails, particularly when pulled laterally or in a sideways direction on the nails. Common washers reduce the tendency of roofing felt to pull over the heads of the nails in an axial direction but do little to resist sideways tears. Storms and winds present in inclement weather have a tendency to tear roofing felt off the roof, destroying the roofing felt, undoing the labor expended to apply the felt, and exposing the sub-roof to water penetration.

There have been some attempts to develop a washer for felt nails that has increased holding or gripping power, but these efforts have not been sufficiently successful. Rigid steel washers, in addition to being expensive, do not resiliently grip the felt. Washers that are quite resilient or flexible, such as the type used for insulation, provide poor edge gripping capabilities at the outer periphery of the washer. One prior washer specifically designed for roofing felt uses a downwardly cupped, molded low density polyethylene washer with a ring shank nail to provide some grip at the outer edges of the washer.

An object of the present invention is to provide an improved means for providing a superior holding or gripping force for roofing nails over a wide area of roofing felt while providing a superior waterproofing seal over the nail hole in the felt.

SUMMARY OF THE INVENTION

A resilient pressure plate for surrounding a nail is molded from plastic material in a concave-convex configuration, with a central boss on the concave underside limiting the degree of diaphragm deflection of the plate as the nail is driven. The nail is received in a central tapered opening that provides an interference fit over a very short axial length of the nail, thus permitting the nail to be driven at a slight angle without affecting the seal between the nail and the plate. The rim of the plate is serrated by concentric ridges that are initially displaced upwardly from each other, proceeding radially inward. On driving the nail to the point of pushing the central boss down to the plane of the outer ridge, the inner ridges become tangent to this same plane to increase the intensity of the engagement of the plate with the felt. The top surface of the central portion of the plate is recessed to accommodate the head of the nail. The intermediate or diaphragm portion of the plate extending between the central area and the outer rim is of progressively decreasing thickness, proceeding outward, to avoid localizing the deflection, and thus provides a strong but resilient pressure around the rim for the engagement of the ridges with the felt material.

DESCRIPTION OF THE PREFERRED EMBODIMENT

Figure 1:
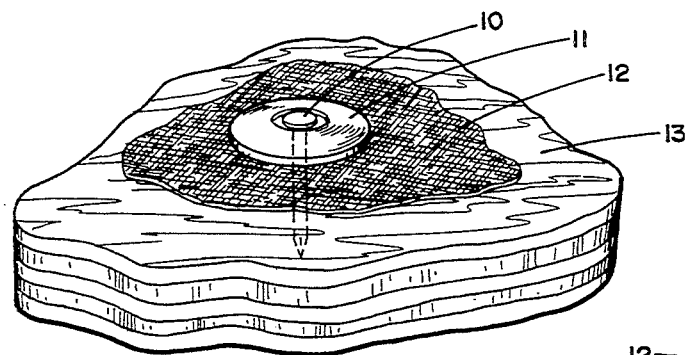
FIG. 1 is a is a perspective fragmentary view showing the engagement of a nail and its surrounding pressure plate with a piece of felt material laid over either a plywood understructure or a slab of insulating material.
Figure 2:
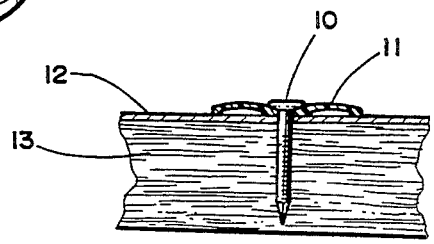
FIG. 2 is a fragmentary sectional elevation showing the driven position of the nail through the pressure plate.
Figure 3:
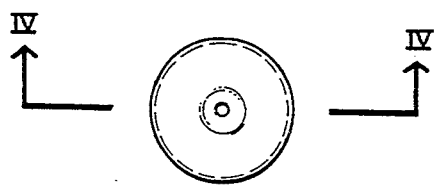
FIG. 3 is a top view of the pressure plate alone.
Figure 4:
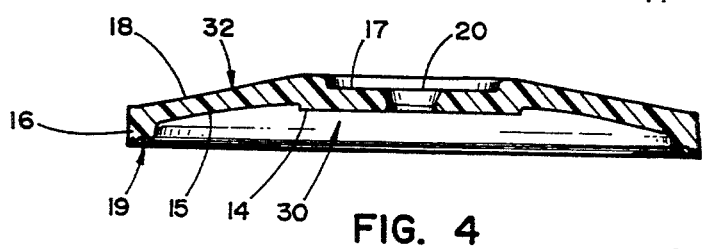
FIG. 4 is a section on an enlarged scale through the plane IV—IV of FIG. 3.
Figure 6:
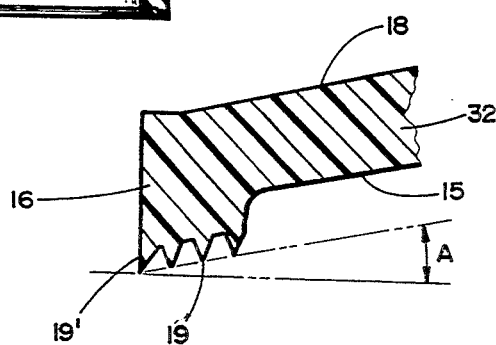
FIG. 6 is a enlarged sectional elevation showing the peripheral portion of the pressure plate.
Figure 7:
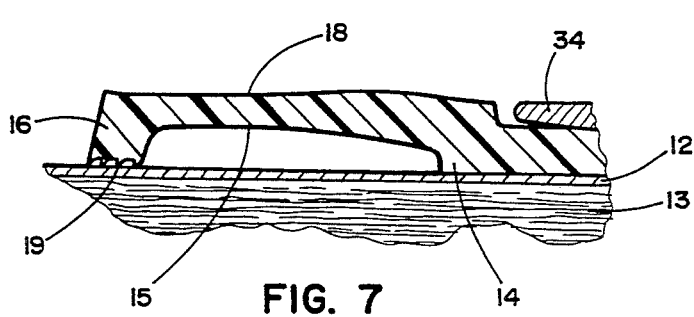
FIG. 7 is a sectional elevation showing the final position of the pressure plate as the nail is fully driven.

Referring to the drawings, FIG. 1 shows a nail 10 driven through a pressure plate 11 holding a sheet of roofing felt 12 in position on a substrate panel 13 represented by a sub-roof structure formed of a wood such as plywood. The configuration of the pressure plate is best shown in FIGS. 4 and 6. A raised central portion 30 includes a boss 14, which extends slightly downward from the recessed or concave underside 15 of the intermediate or diaphragm portion 32 of the plate extending from the central boss out to the peripheral rim 16. The top surface of the central portion providing the boss 14 is recessed as shown at 17 to receive the head 34 of the nail. The top convex surface 18 of the diaphragm portion is spaced from the undersurface 15 by a progressively decreasing amount, proceeding radially outward, to produce a stiffness gradient that tends to remove concentrations of deflection toward the central area. The peripheral rim 16 is serrated on the underside by a series of concentric ridges 19. Referring to FIGS. 4 and 6, it should be noted that the lower points of these ridges are disposed at an inclined angle A in the undeflected condition of the pressure plate shown in FIG. 4. As the lower surface of the central boss 14 is driven downward as the nail 10 is set, the limit of the diaphragm deflection of the plate is reached when the lower surface of the boss 14 becomes coplanar with the outer of the ridges 19. Under this condition, shown in FIG. 7, a firm and resilient pressure from the spring deflection of the diaphragm section urges the ridges 19 into solid and uniform engagement with the felt material 12.

Figure 5:
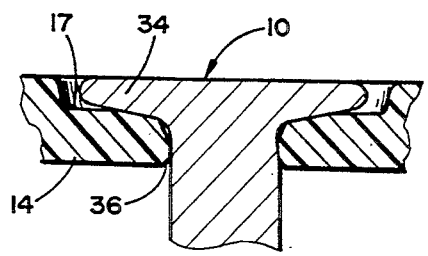
FIG. 5 is a section on an enlarged scale showing the central portion of the pressure plate as it is engaged by the roofing nail.

The central opening 20 receiving the nail 10 is preferably tapered inwardly from both the top and bottom, as shown in FIG. 4, with the constricted portion providing a forced fit around the shank of the nail, as shown in FIG. 5. This permits a considerable degree of articulation of the pressure plate with respect to the nail, particularly if the nail has been slightly slanted as it is driven. The interference fit at the constricted portion of the opening 20 induces a degree of plastic flow of the material of the pressure plate. This plastic remains in the space between the nail and the tapered opening at the bottom 36 of the boss, so the plastic does not extend downwardly below the boss so as to interfere with the bottoming of the pressure plate against the surface 14. Such could easily be the case if all of the taper were at the upper end of the opening 20. Putting at least some of the taper at the upper portion of the opening, however, assists in centering the nail as it is being driven. In cases where the plate 10 may be marketed already engaged by a nail, the interference fit assists in maintaining this assembled relationship. The interference fits also tends to make the nail assembly more watertight.

The preferred material for the pressure plate is polypropylene, due to its relative stiffness and resilience. Nylon, Lexan, acrylics, and polycarbonates and other resins having good spring like resilience characteristics also would work. Low density polyethylene is not preferred because it is softer and develops less downward peripheral pressure on the rim than the plastic resins.

In a typical application, the pressure plate is fastened with a ring shank nail, although a spiral nail or spiral drive screw could be employed. The holding power of the fastener itself in the substrate typically ranges from one hundred (100) to two hundred-fifty (250) pounds of pull out force to remove the fastener. A pull out force of about one hundred-fifty (150) pounds is common.

It is desirable that the pressure plate be formed of a sufficiently rigid material that when the pressure plate is spring loaded by nailing it to the substrate, a firm clamping force is exerted on the outer rim of the pressure plate, yet the pressure plate will not pull out the nail.

In the preferred practice of the present invention, the pressure plate has a diameter of about 0.750 to about 1.25 inches, with a diameter of one inch being preferred. As the area of the pressure plate decreases, the area gripped by the pressure plate becomes smaller and the resistance to tearing thus is reduced. When a pressure plate is much larger than 1.25 inches in diameter, the pressure plate can tend to pull the nail out.

Desirably, the central boss is spaced perpendicularly away from the plane of the outer rim (this plane being the lowermost plane of the rim in its undeflected position) by a distance of about 0.040 to about 0.075 inches, with a distance of 0.065 inches being preferred.

The shape of the rim is quite significant. First, the rim should be relatively high from the lowest point to the top of the rim. Desirably, the height should be between about 0.050 and 0.10 inches, with a height of 0.070 inches being preferred. The rim also should be fairly wide to provide for several concentric ridges and to provide a relatively thick pressure band where the rim presses against the roofing felt. Desirably, the width of the band should be at least about 0.02 inches and up to about 0.125 inches, with 0.045 inches being preferred. If the band is too large, a downward force is spread over such a large area that the pressure of the rim is decreased. If the width of the band is too small, the band tends to cut its own hole in the roofing felt. With the band of the preferred width and the gripping means being several concentric ridges, a strong gripping force is exerted on the roofing felt.

The intermediate portion of the pressure plate is connected to an upper portion of the outer rim and to an upper portion of the central boss, such that the intermediate portion is spaced well away from the surface of the roofing felt, even when the pressure plate is deflected. This is significant, because this construction permits the outer rim to be pressed downwardly against the roofing felt when the pressure plate is in its deflected position (see FIG. 7). If the pressure plate were to bow or dish when it deflects so that it came into contact with the roofing felt, this would relieve the pressure on the outer rim and reduce the holding force of the pressure plate. By having an outer rim that is fairly thick, the intermediate portion can be connected to the outer rim at a distance that is spaced well away from the plane of the outer rim.

Even the angles of the ridges or teeth on the outer rim are significant features in the holding force of the pressure plate. The angles between the inclined surfaces forming the ridges should be sharp enough so that the ridges dig in but large enough to keep the ridges from bending or breaking during application of the pressure plate. Desirably, the angle of the outer ridge 19' should be about 15°–30° and the angle of ridges 19 should be about 30°–60°, with the preferred angles being 20° and 40°.

As stated above, the material from which the pressure plates are molded is another important feature of the invention. With a soft material, such as polyethylene, the holding force is reduced, whereas with a stiffer material such as polypropylene or a material having comparable resilience characteristics, the holding force is much greater. Moreover, the holding force of polypropylene is effective over a wide temperature range whereas polyethylene tends to become soft at higher temperatures.

The following are the dimensions of a one inch polypropylene pressure plate that has been found to be very effective:

Inside diameter of the rim, 0.915"
Outside diameter of the central boss on the underside, 0.385"
Inner diameter of the top surface of the diaphragm portion, 0.305"
Thickness of the diaphragm portion adjacent the peripheral rim, 0.040"
Thickness of the diaphragm portion at the inner extremity, 0.053"
Major diameter at the bottom of the tapered central hole, 0.105"
Minor diameter at the constricted portion of the central hole, 0.085"
Major diameter of the upper tapered portion of the central hole, 0.130"
Height of the ridges forming the serrated rim, 0.012"
Distance of the point of constriction of the central hole downward from the top surface of the nail recess, 0.026"
Thickness of the central portion of the plate, 0.040"
Depth of the top recess for receiving the nail head, 0.026"
Undeflected distance from the underside of the central boss to the plane of the outer peripheral ridge, 0.065"
Height of the peripheral rim, 0.070"
Vertical distance from the top of the plate to the lower extremity of the rim, 0.130"

The holding force of the present invention is excellent and far exceeds the holding force of the known polyethylene washer used for roofing felt. For example, at a low temperature of −20° F., the holding force of the present invention is forty about (40) pounds, whereas the holding force of the prior device is twenty-two (22) to twenty-three (23) pounds. At a temperature of 160° F. (which is not atypical on a hot roof), the present invention has a holding force of about thirty (30) pounds, whereas the comparative prior device has a holding force of about fifteen (15) pounds. The holding forces referred to herein are lateral pulling forces required to tear roofing felt off a nail in a sideways direction.

It should be understood that the foregoing embodiment is merely representative of the preferred practice of the present invention and that various changes and modifications may be made in the arrangements and details of construction of this embodiment without departing from the spirit and scope of the present invention, as defined in the appended claims.

I claim:

1. A pressure plate for use in conjunction with a roofing nail, comprising:
   a peripheral rim, the rim lying in a plane at a lower edge thereof;
   a raised central portion spaced above the plane of the rim, said central portion having an opening for receiving a nail; and
   a resilient intermediate portions extending between the rim and the central portion, the intermediate portion being formed of material having resilient characteristics, the intermediate portion having a concave surface on the normally underside thereof extending from said rim to said central portion, said intermediate portion having a convex upper surface extending to said central portion, the intermediate portion being spaced from the plane of the rim such that when the central portion of the pressure plate is nailed down on a substrate, the intermediate portion remains spaced from the plane of the rim and resiliently presses the peripheral rim downwardly against the substrate.

2. A plate as defined in claim 1, wherein said intermediate portion decreases in thickness, proceeding radially outward.

3. A plate as defined in claim 1, wherein said central portion has a recess in the top surface thereof for receiving the head of a nail.

4. A plate as defined in claim 1, wherein said opening has a section tapering to reduced diameter, and adapted to provide an interference fit on a roofing nail over a reduced axial length of said opening.

5. A plate as defined in claim 1, wherein said rim has a plurality of concentric ridges, the inner of said ridges being offset normally upwardly from an adjacent outer ridge in the initial undeflected condition of said plate, said ridges becoming substantially coplanar with the plane of the rim on deflection of said plate to position the normally underside of said central portion coplanar with the outer of said ridges.

6. A plate as defined in claim 5, wherein the rim is circular and is 0.02 to 0.125 inches wide and the ridges are spaced over the width of the rim, the pressure of the plate being thus concentrated on the rim, the resilient material of the intermediate portion providing a downward gripping force on the rim but not such a strong gripping force that the rim cuts through roofing felt materials being secured by the plate.

7. A pressure plate for use in conjunction with a nail or screw to fasten roofing felt to substrate, the pressure plate comprising a disk member defining an axis at a center thereof and formed of material having resilient characteristics, the disk member having an outer peripheral rim lying in a plane at a lower edge thereof with gripping means thereon for engaging the roofing felt around the periphery of the rim and holding the roofing felt downwardly against the substrate, the gripping means comprising a plurality of concentric ridges extending downwardly from the rim having lower edges that grid the roofing felt, the member having a raised central portion spaced away from the plane of the rim, an intermediate portion spaced away from the plane of the rim interconnecting the rim and central portion, the rim having an axial thickness greater than that of the intermediate portion, the intermediate portion being formed of a resilient material that deflects downwardly to permit the central portion to move into abutment with the roofing felt when the pressure plate is nailed to the substructure, the central portion being shaped and spaced from the plane of the rim such that the rim is resiliently biased against the roofing felt when the pressure plate is nailed to the substrate with the central portion in abutment with the roofing felt.

8. A pressure plate according to claim 7, wherein the rim is about 0.05 to 0.10 inches high, with the intermediate portion being spaced about 0.040 to 0.070 inches from the lowermost plane of the rim where the intermediate portion is connected to the rim, such that no contact between the intermediate portion and the roofing felt reduces the downward pressure applied on the rim when the pressure plate is in its deflected position.

9. A pressure plate according to claim 7, wherein the central portion includes a boss that extends downwardly toward the plane of the rim, the boss limiting the downward deflection of the central portion and hence the resilient pressure on the rim when nailing the pressure plate to the substrate.

10. A pressure plate according to either one of claims 1 or 7, wherein the pressure plate is formed from one or a combination of materials in the group consisting of polypropylene, Nylon, Lexan, acrylic, and polycarbonate.

11. A pressure plate according to claim 7, wherein the ridges comprise inner and outer ridges, the inner ridges being spaced above the plane of the outer ridges when the pressure plate is in its undeflected state, the deflection induced in the pressure plate by nailing it to the substrate causing the ridges to become substantially coplanar, thus causing coplanar gripping engagement of the inner and outer ridges on the roofing felt when the pressure plate is deflected.

12. A pressure plate according to claim 11, wherein the bottom edges of the ridges are inclined upwardly from the outer to the inner sides of the rim at an angle of about 15° to 30° with respect to the plane of the lowermost portion of the rim.

13. A pressure plate according to claim 7, wherein the rim is about 0.02 to 0.125 inches wide so as to provide a broad gripping surface on the roofing felt.

* * * * *